United States Patent Office 3,843,516
Patented Oct. 22, 1974

3,843,516
PROCESS FOR TREATING WASTE SOLUTIONS CONTAINING CYANO-HEAVY METAL-COMPLEX COMPOUNDS
Tuneto Yamada, Seimei Kondo, and Satoshi Yoshihara, Niigata, Tokuji Sugahara, Tokyo, and Shuji Murakami, Masatsune Ito, and Kunio Hirata, Niigata, Japan, assignors to Toyo Gas Chemical Industry, Inc., Tokyo, Japan
No Drawing. Filed Jan. 8, 1973, Ser. No. 321,637
Claims priority, application Japan, Jan. 10 1972, 47/5,066
Int. Cl. B01d 21/00
U.S. Cl. 210—22
6 Claims

ABSTRACT OF THE DISCLOSURE

Waste solutions containing cyano-heavy metal-complex compounds are treated by adding thereto phosphoric acid, sulfuric acid and an oxidizing agent and then effecting a decomposition reaction of the cyano-heavy metal-complex compound or compounds in said waste solution to separate the cyanide moiety and at the same time to convert the heavy metal ion into a soluble heavy metal salt.

BACKGROUND OF THE INVENTION

Field of the invention

This invention relates to a process for treating waste solutions containing cyano-heavy metal-complex compounds such as ferrocyanide and ferricyanide, in particular, waste solutions from the development of photographic color film.

Description of the prior art

A ferricyanide, which is called potassium ferricyanide, in a compound having an oxidizing function and a ferrocyanide, which is called potassium ferrocyanide, is a compound having a reducing function. These compounds react so sensitively with iron ions that such sensitivity is commonly utilized as one of the techniques for qualitative analysis. In general, a ferricyanide ion gives Turnbull's blue precipitate from a neutral or acidic solution containing bivalent iron ion. This precipitate is presumed to be a mixture of $Fe_3[Fe(CN)_6]_2$ and $KFe[Fe(CN)_6]$. The ferricyanide ion, however, does not give any precipitate with trivalent iron ion but changes the color of the solution to brown. A ferrocyanide ion gives a white precipitate from a neutral or acidic solution containing bivalent iron ion, but this precipitate is immediately oxidized by air to gve dark blue prussian blue. The ferrocyanide ion gives, from a neutral or acidic solution containing trivalent iron ion, a dark blue principitate of Berlin blue $Fe_4[Fe(CN)_6]_3$.

As above indicated, the precipitates obtained by the reaction of a ferricyanide ion or ferrocyanide ion with an iron ion in neutral or acidic solution have strong color developing poperties.

Further, the precipitates are of fine particle size so that the filterability thereof is very poor. Since the precipitates contain cyanide moiety, they cannot be discarded as they are and it is required that an additional treatment be effected. However, the aforesaid complex salts have lower dissociation constants than potassium ferricyanide or potassium ferrocyanide, and they are so stable that they can be decomposed only with difficulty, unless there is carried out high temperature decomposition in a pressure vessel at a temperature higher than 140° C. or some other specific treatment. The high temperature decomposition in a pressure vessel gives rise to serious problems with respect to safety and operativeness, because the resulting gas formed by the decomposition contains very poisonous cyanide gas. Ozonolysis and electrolytic oxidation are additional procedures for treating such precipitates. However, these procedures are high in cost. With respect to other oxidation processes, the activated sludge process and alkali chlorine method, there are problems as regards incompleteness of the removal of cyanide moiety in the form of a complex compound, cost for equipment and the time required for the treatment.

Potassium ferricyanide is extensively used in various manufacturing steps, for example, bleaching of films in color photography developing laboratories, and bleaching is effected by utilizing the oxidizing function of potassium ferricyanide. As potassium ferricyanide is used repeatedly in the bleaching step, it is reduced to potassium ferrocyanide and thus the potassium ferricyanide solution becomes a mixture of potassium ferricyanide and potassium ferrocyanide. A part of the mixed solution is carried over into the step for washing with water after the bleaching step. Consequently, in the waste solutions exhausted from the bleaching step and the water-washing step, there is contained a very high concentration of cyanide and therefore such waste solutions cannot be discarded as is because of water pollution laws. The cyanide moiety must be removed by some procedure.

As a procedure for treating the waste solution from the bleaching step, the waste solution is subjected to thermal decomposition with the addition of an acid. In this procedure, however, bivalent and trivalent iron ions are formed by the decomposition and these ions react with undecomposed potassium ferricyanide and potassium ferrocyanide, respectively, to give a precipitate of a cyano-complex compound having a complex molecular formula. In order to inhibit the formation of the precipitate, a sequestering agent such as EDTA may be added at the same time. However, a sequestering agent is very expensive and the use of it is not practicable from the viewpoint of economy in treating a large quantity of cyano-complex compound-containing waste solution.

SUMMARY OF THE INVENTION

We have discovered that in the practice of thermal decomposition of a waste solution containing cyano-heavy metal-complex compounds, such as ferrocyanide and ferricyanide, by adding thereto phosphoric acid, the addition of an oxidizing agent in addition to said phosphoric acid and, also, the incorporation of sulfuric acid into said phosphoric acid are very effective to inhibit the formation of precipitate and to accelerate the decomposition.

According to our invention, the cyanide moiety is separated and at the same time iron ions are converted into soluble iron salts by decomposing ferricyanide and ferrocyanide by adding to the solution containing ferricyanide and ferrocyanide (1) a mixed acid comprising phosphoric acid and sulfuric acid and further (2) an oxidizing agent, to convert a salt of bivalent iron into a salt of trivalent iron and thereafter heating and agitating the solution, with air or other suitable gas such as nitrogen.

The oxidizing agent used in the present invention is an inorganic oxidizing agent which will be selected from chlorates such as potassium chlorate, sodium chlorate; perchlorates such as ammonium perchlorate, potassium perchlorate and sodium perchlorate; peroxides such as hydrogen peroxide, sodium peroxide, and potassium peroxide; nitric acid; permanganates such as potassium permanganate and ammonium permanganate; bichromates such as sodium bichromate and potassium bichromate; hypochlorites such as sodium hypochlorite and potassium hypochlorite; oxidizing gases such as chlorine gas and ozone. Physical chemical oxidations such as electrolytic oxidation can be also employed.

As the mixed acid, a mixture of phosphoric acid and sulfuric acid is used. These acids need not always be mixed prior to use. It is satisfactory to add them at the same time to the waste solution to be treated. For practical convenience, however, these acids are preferably mixed prior to adding them to the solution to be treated. The mixing ratio of the acids is 99–20 parts by weight of phosphoric acid per 100 parts by weight of total mixed acids. When phosphoric acid is added alone, an iron phosphate produced on the decomposition of the cyano-complex compound is left as a precipitate, because it is less soluble in water. When sulfuric acid is present in that case, however, the iron phosphate is converted into iron sulfate which is more soluble in water and the formation of a precipitate is not observed.

On the other hand, the cyanide moiety formed by the decomposition is converted to hydrogen cyanide gas. This is absorbed by a sodium hydroxide solution and converted therein into sodium cyanide, which is either recovered or decomposed with sodium hypochlorite into carbonic acid gas and nitrogen gas and thus is made non-toxic. The waste solution in which oxidation decomposition has been completed is neutralized by adding an alkaline solution and thereafter is discarded.

The reaction mechanism in the above oxidation decomposition procedure can be represented by the following equations:

(Oxidation reaction)
$$[Fe(CN)_6]^{-4} + O \rightarrow [Fe(CN)_6]^{-3}$$
(Decomposition reaction)
$$[Fe(CN)_6]^{-3} + acid \rightarrow Fe\ salt + 6HCN$$

The process of this invention is extremely effective from the viewpoints of economy, operativeness and safety for treating not only waste solutions containing cyano-iron-complex compounds but also waste solutions containing cyano-complex compounds of metals such as nickel, copper, gold and cobalt which have a very small dissociation constant and in which the concentration of cyanide is very high.

The above oxidation decomposition step is carried out by heating the solution to a temperature of more than 40° C., while blowing a gas such as air into the solution.

The gas should be introduced into the solution continuously to agitate the solution and drive the generated hydrogen cyanide gas out of the solution.

The quantity of the oxidizing agent and acid to be added to the waste solution is selected depending on the quantity of reductive complex compound present in the solution of cyano-complex compound mixture (when another reductive compound is co-existing in said solution, the quantity thereof is also included) and the concentration of cyanide. Thus, according to the process of this invention, it is possible to suitably select the quantity of the oxidizing agent and acid to be added, according to need, as far as the amounts thereof used are at least the stoichiometric amounts effective for converting the cyano-metal complex compounds into soluble metal salt and hydrogen cyanide according to the above reaction mechanism. However, the concentrations of acids in the solution after the addition thereof should be less than 2.0 mol/l. of sulfuric acid and less than 2.0 mol/l. of phosphoric acid. The time required for completing the decomposition is also similarly selected.

The present invention will be further described in the following illustrative Examples in a more detailed manner.

Example I

To 3.06 litres of a solution of a mixture of potassium ferricyanide and potassium ferrocyanide which contained 27,959 mg. of cyanide in total, were added 92 ml. of phosphoric acid and 61 ml. of sulfuric acid and, further 153 ml. of an aqueous solution containing 3.56 g. of sodium bichromate (dihydrate) to cause an oxidation reaction. Thereafter, the reaction mixture was heated and maintained at 95° C. while introducing thereinto air under reduced pressure at a rate of 3 litres per minute. The resulting generated cyanide gas was absorbed by aqueous sodium hydroxide solution.

The results as shown in the table below were obtained.

| Heating time (min.) | 0 | 30 | 60 | 120 | 180 |
|---|---|---|---|---|---|
| Total cyanide content in solution (mg.) | 27,959 | 8,296 | 1,148 | 321 | 204 |
| Decomposition rate of cyanide (percent) | 0 | 70.3 | 95.9 | 98.8 | 99.3 |

No formation of precipitate was observed and the solution was transparent.

Example II

To 0.494 litres of a solution of a mixture of potassium ferricyanide and potassium ferrocyanide which contained 4570 mg. of cyanide in total, were added 15 ml. of phosphoric acid and 10 ml. of sulfuric acid and, further, 12 ml. of a saturated potassium permanganate solution to cause an oxidation reaction. Thereafter, the reaction mixture was heated and kept at 95° C. for 2 hours while introducing air thereinto at a rate of 1 litre per minute under reduced pressure.

The resulting cyanide gas was absorbed by an aqueous sodium hydroxide solution.

The total cyanide content in the solution was 18 mg. after two hours.

On the other hand, the total cyanide content in the aqueous sodium hydroxide solution was 4552 mg. and thus the decomposition rate is calculated as 99.6%.

Formation of precipitate was not observed and the solution was transparent.

Example III

To 0.494 litres of a solution of a mixture of potassium ferricyanide and potassium ferrocyanide which contained in total 4570 mg. of cyanide, was added 15 ml. of phosphoric acid and 10 ml. sulfuric acid and further 1.3 g. of 30% aqueous hydrogen peroxide solution to cause an oxidation reaction. Thereafter, the same treatment as in Example II was repeated. After two hours, the total content of cyanide in the solution was 5 mg. and the total content of cyanide in the aqueous sodium hydroxide solution was 4565 mg. Thus, the decomposition rate of cyanide was 99.9%.

There was not observed any formation of precipitate and the solution was pale yellow and clear.

Example IV

To 0.494 l. of a waste aqueous solution from a color photography development laboratory which contained 7873 mg. of cyanide in total, were added 15 ml. of phosphoric acid and 10 ml. of sulfuric acid, and further 1.3 g. of 30% aqueous hydrogen peroxide solution to cause an oxidation reaction. Thereafter, the reaction mixture was heated and maintained at 95° C. while introducing thereinto air under reduced pressure at a rate of 1 litre per minute. The generated cyanide gas was absorbed by aqueous sodium hydroxide solution. After 2 hours, the total content of cyanide in the aqueous sodium hydroxide solution was 25 mg. and, thus, the decomposition rate of cyanide was 99.7%.

Formation of precipitate was not observed and the solution was transparent.

Example V

To 0.9 litre of a solution obtained by diluting a waste solution from a plating factory, which contained 36.46 g./l. of cyanide in total, with water to a one-third concentration, were added 108 ml. of phosphoric acid and 72 ml. of sulfuric acid, and further 10 ml. of 25% aqueous sodium hypochlorite solution to cause an oxidation reaction. Thereafter, the same treatment as in Example IV was repeated. The generated cyanide gas was absorbed by aqueous sodium hydroxide solution. After two hours, no cyanide was detected in the solution. Thus, the decomposition rate of cyanide was 100%.

There was not observed any formation of precipitate.

Example VI

To 1 litre of a waste aqueous solution containing cyano-iron-complex compounds in high concentration, which contained 2300 mg. of cyanide and was obtained by concentrating with a conventional method a waste aqueous solution containing cyano-iron-complex compounds in 11 mg./l. as cyanide in total exhausted from a steel foundry, were added 30 ml. of phosphoric acid and 20 ml. of sulfuric acid, and further 5.5 ml. of 25% aqueous sodium hypochlorite solution to cause an oxidation reaction. Thereafter, the same treatment as in Example IV was repeated. After two hours, the total content of cyanide in the aqueous sodium hydroxide solution was 1.4 mg.

There was not observed any formation of precipitate.

The embodiments of the invention in which an exclusive property or privilege is claimed are defined as follows:

1. A process for treating an aqueous solution containing ferricyanide and ferrocyanide complex compounds which comprises adding to said solution (1) phosphoric acid, (2) sulfuric acid and (3) an oxidizing agent, and then decomposing the mixture to convert the iron into a soluble iron salt and to remove cyanide from the solution.

2. A process according to Claim 1 in which the oxidizing agent is selected from the group consisting of hydrogen peroxide, potassium permanganate, potassium bichromate, sodium bichromate and hypochlorous acid.

3. A process according to Claim 1, in which the phosphoric acid is from 20 to 99 parts by weight, per 100 parts by weight of phosphoric acid plus sulfuric acid.

4. A process according to Claim 1, in which the amounts of (1), (2) and (3) used are at least the stoichiometric amounts effective for converting the complex compounds into soluble iron salt and hydrogen cyanide.

5. A process according to Claim 1, in which the decomposing step is effected by introducing a gas into the solution and heating the solution to a temperature of more than 40° C. to evolve hydrogen cyanide gas and absorbing the hydrogen cyanide gas in an aqueous sodium hydroxide solution.

6. A process according to Claim 1, in which the oxidizing agent is selected from the group consisting of potassium chlorate, sodium chlorate, ammonium perchlorate, potassium perchlorate, sodium perchlorate, hydrogen peroxide, sodium peroxide, potassium peroxide, nitric acid, potassium permanganate, ammonium permanganate, sodium bichromate, potassium bichromate, sodium hypochlorite, potassium hypochlorite, chlorine gas and ozone.

References Cited

Chemical Engineering, July 1954, pp. 142–144, vol. 61, #7.

FRANK A. SPEAR, JR., Primary Examiner

F. H. LANDER, Assistant Examiner

U.S. Cl. X.R.

210—50, 59, 63